April 2, 1963   D. M. ATKINSON   3,083,451
BERYLLIUM BRAZING
Filed Sept. 25, 1959

INVENTOR
DENZIL MALCOLM ATKINSON

BY Lawson and Taylor

3,083,451
BERYLLIUM BRAZING

Denzil Malcolm Atkinson, Southgate, London, England, assignor to Associated Electrical Industries (Manchester) Limited, London, England, a company of Great Britain
Filed Sept. 25, 1959, Ser. No. 842,341
Claims priority, application Great Britain Sept. 21, 1959
7 Claims. (Cl. 29—487)

This invention relates to the brazing of beryllium. It is a continuation-in-part of co-pending U.S. patent application Serial No. 718,956, now abandoned, assigned to the assignees of the present invention.

There are many applications in which it is desirable to braze beryllium in a manner which will resist subsequent fracture, one important application being in X-ray tubes. Beryllium is a particularly convenient material to use as an X-ray window in such tubes as it has a low absorption to X-rays. Clearly it is necessary to provide a vacuum-tight joint between the beryllium window and its surrounding frame.

However, it is notoriously difficult to obtain a brazed joint with beryllium that will not fracture, particularly when subjected to high temperatures and stresses.

It is accordingly an object of the present invention to provide a more satisfactory joint than can be made by known methods.

According to the present invention the method of brazing beryllium comprises interposing a brazing solder containing palladium between the beryllium and a base metal to which the beryllium is to be brazed, heating the assembly to a temperature below the solidus temperature of the solder and high enough to cause interdiffusion to take place between the beryllium and the solder, maintaining this temperature for a period sufficient to bring about a limited degree of interdiffusion, raising the temperature of the assembly above the liquidus temperature of the solder for a time sufficient to produce a brazed joint, and then cooling the assembly.

In carrying out the invention in one embodiment the assembly was maintained at the interdiffusion temperature for about 5 minutes and was then held at the brazing temperature for a further 1 minute. It is convenient to apply a limited amount of pressure to assist in bringing about interdiffusion and brazing.

It is desirable to rapidly cool the assembly after brazing at least through the temperature range of interdiffusion so as to prevent this occurring subsequent to the brazing.

Figure 1:
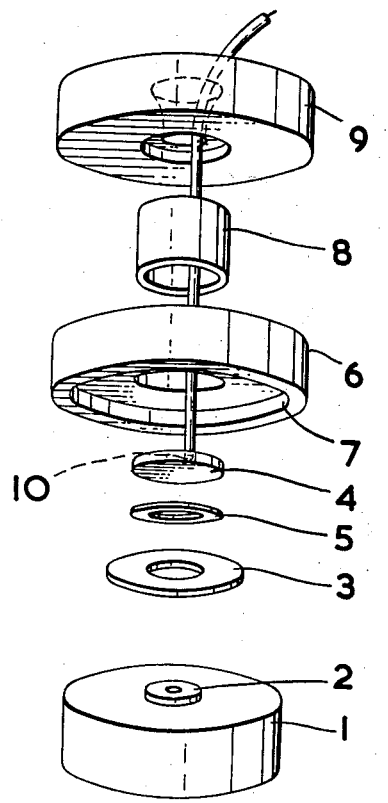
Figure 2:
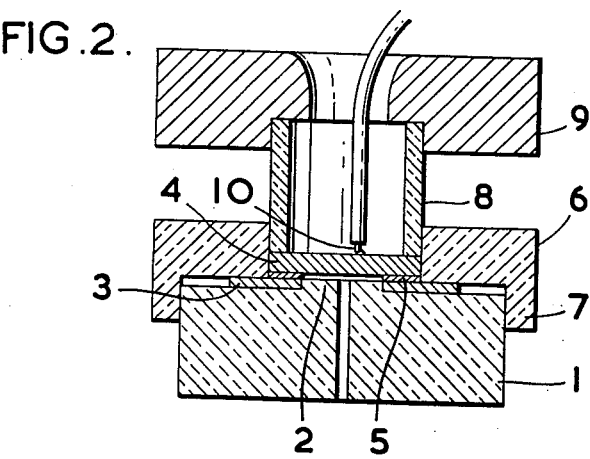

In order that the invention may be more fully understood reference will now be made to the accompanying drawing in which:

FIG. 1 is an exploded view of the component parts of a jig used in performing the invention, and FIG. 2 is a cross section of the assembled parts shown in FIG. 1.

Referring to the drawing a cylindrical graphite base 1 is provided on one face of which there is an integral boss 2 which serves to locate a frame 3 of Monel metal to which beryllium window 4 is to be brazed. Alternatively frame 3 can be constructed of copper-plated mild steel. Between beryllium window 4 and Monel metal frame 3 there is interposed a washer 5 of brazing solder containing palladium. A convenient value for the thickness of the washer is 0.003". To accurately locate window 4 and washer 5 relative to frame 3 a hollow graphite cylinder 6 is provided which after assembly of parts 4 and 5 on part 3 is placed in position over graphite base 1. Cylinder 6 has a hollow central bore of diameter which is just greater than window 4 and washer 5 and has a dependent skirt 7 which forms a sliding fit round the circumference of graphite base 1. Thus cylinder 6 when placed in position, as shown in FIG. 2 locates window 4 and washer 5 relative to frame 3.

In order to apply slight pressure to the assembly a graphite tube 8 is provided which fits within the bore of cylinder 6 and rests on window 4. Tube 8 has sufficient axial length to be proud of cylinder 6 when in this position and it supports a weight 9 of Monel metal which rests on its upper surface. For a window 4 of ½" diameter, the mass of weight 9 can be in the region of 100 gms. A thermo-couple 10 is inserted through the bore of weight 9 and tube 8 and rests on window 4 so that an accurate determination of the temperature thereof can be obtained. This thermo-couple can have a platinum/platinum-rhodium junction.

Before brazing the beryllium can be etched, although this may not always be necessary. A 5% solution of hydrofluoric acid in alcohol is suitable for etching. The frame should also be outgassed prior to brazing.

The composition of the brazing solder is preferably 65% silver, 20% copper and 15% palladium. Using such a solder the temperatures and times of the process are as set forth below.

The complete assembly is quickly brought up to 830° C.–840° C. in a radiation furnace in a vacuum of $10^{-5}$ mm. of mercury or better. Alternatively a high purity hydrogen atmosphere can be maintained in the furnace and it is not necessary for the hydrogen to be completely dried. The assembly is maintained at this temperature for 5 minutes and is then raised to the brazing temperature of 910° C. where it is held for 1 minute. Finally the assembly is rapidly cooled to 700° C., which is below the temperature range at which interdiffusion takes place. The temperatures are as read by thermo-couple 10.

A joint constructed in accordance with the above method has been found to be very strong and unlike joints constructed according to previously used methods it is capable of withstanding tension. In fact shear stresses of 6,000 lbs. per square inch have been applied to such a joint without causing fracture and the maximum stresses which such a joint can withstand may well be considerably in excess of this value. Thus in the case of an X-ray tube for instance it is possible to place a window on the vacuum side of its frame, where it is subjected to tensile stresses, without any risk of fracture. Hitherto beryllium brazed joints have been able to resist compression only. Furthermore the joints can be heated and cooled any number of times without fracturing provided the maximum temperature is kept below the interdiffusion temperature, i.e. is kept below 700° C.

While the preferred composition of the brazing solder is as mentioned above the invention should not be considered as being limited to such proportions. In fact the lower limit of the proportion of palladium is determined by its wetting power and the upper limit by the maximum temperature at which it is desired the brazing solder shall be completely melted. In practice this determines the range of the proportion of palladium as being between 10% and 20%. The remaining constituents of the solder are silver and copper and the relative proportions of these constituents of the solder may vary from 1 part copper to 2 parts silver to 4 parts copper to 11 parts silver. Expressed as percentages the proportion of silver can extend from 55–70%, the proportion of copper from 20–30% and the proportion of the palladium from 10–20%.

What I claim is:

1. The method of brazing beryllium comprising interposing a brazing solder containing about 65% silver, about 20% copper and about 15% palladium between the beryllium and a base metal to which the beryllium is to be brazed, heating the assembly to between 830° C. and 840° C., maintaining this temperature for a period sufficient to bring about a limited degree of interdiffusion, raising the temperature of the assembly to about 910° C. for a time sufficient to produce a brazed joint and then allowing the brazed assembly to cool.

2. The method of brazing beryllium comprising interposing a brazing solder containing 65% silver, 20% copper and 15% palladium between the beryllium and a base metal to which the beryllium is to be brazed, heating the assembly to a temperature of between 830° C. and 840° C., maintaining this temperature for about 5 minutes, raising the temperature of the assembly to 910° C. and maintaining this temperature for one minute, and then rapidly cooling the brazed assembly to a temperature below 700° C.

3. A method of brazing beryllium comprising placing a brazing solder between the beryllium and a base metal to which the beryllium is to be brazed, said solder consisting essentially of between 55% to 70% silver, between 20% to 30% copper, and between 10% to 20% palladium, the sum total of the three stated materials used in said solder being 100%, heating the assembly to a temperature below the solidus temperature of the solder but high enough to cause interdiffusion to take place between the beryllium and the solder, maintaining this temperature for a period sufficient to bring about a limited degree of interdiffusion, raising the temperature of the assembly above the liquidus temperature of the solder for a time sufficient to produce a brazed joint, and then cooling the brazed assembly.

4. A method in accordance with claim 3, wherein the heating of the assembly to a temperature below the solidus temperature but high enough to cause interdiffusion is accomplished in a vacuum.

5. A method in accordance with claim 3, wherein the reating of the assembly to a temperature below the solidus temperature but high enough to cause interdiffusion is accomplished in an atmosphere of hydrogen of high purity.

6. A method of brazing beryllium comprising placing a brazing solder between the beryllium and a base metal to which the beryllium is to be brazed, said solder consisting essentially of between 55% to 70% silver, between 20% to 30% copper, and between 10% to 20% palladium, the sum total of the three stated materials used in said solder being 100%, applying pressure between the beryllium and said base metal, heating the assembly to a temperature below the solidus temperature of the solder but high enough to cause interdiffusion to take place between the beryllium and the solder, maintaining this temperature for a period sufficient to bring about a limited degree of interdiffusion, raising the temperature of the assembly above the liquidus temperature of the solder for a time sufficient to produce a brazed joint, and then rapidly cooling the brazed assembly below the temperature at which interdiffusion takes place.

7. The method of brazing beryllium comprising interposing a brazing solder between the beryllium and a base metal to which the beryllium is to be brazed, said solder consisting essentially of between 55% to 70% silver, between 20% to 30% copper, and between 10% to 20% palladium, the sum total of the three stated materials used in said solder being 100%, heating the assembly to between 830° C. and 840° C., maintaining this temperature for a period sufficient to bring about a limited degree of interdiffusion, raising the temperature of the assembly to about 910° C. for a time sufficient to produce a brazed joint, and then allowing the brazed assembly to cool.

References Cited in the file of this patent

UNITED STATES PATENTS

| | | |
|---|---|---|
| 2,310,568 | Atlee | Feb. 9, 1943 |
| 2,406,310 | Agule | Aug. 27, 1946 |
| 2,719,797 | Rosenblatt et al. | Oct. 4, 1955 |
| 2,748,067 | Pease et al. | May 29, 1956 |
| 2,770,033 | Zarth | Nov. 13, 1956 |
| 2,844,868 | Cline et al. | July 29, 1958 |

FOREIGN PATENTS

| | | |
|---|---|---|
| 573,176 | Great Britain | Nov. 9, 1945 |